United States Patent [19]

Ogata et al.

[11] 3,791,924
[45] Feb. 12, 1974

[54] BIOLOGICAL METHOD OF PRODUCING PHENOLIC AMINO ACIDS

[75] Inventors: Koichi Ogata, Osaka; Hideake Yamada; Hitoshi Enei, both of Kanagawa; Shinji Okumura, Tokyo, all of Japan

[73] Assignee: Ajinomoto Co., Inc., Tokyo, Japan

[22] Filed: Oct. 13, 1971

[21] Appl. No.: 188,991

Related U.S. Application Data

[63] Continuation-in-part of Ser. No. 879,934, Nov. 25, 1969, abandoned.

[30] Foreign Application Priority Data

Dec. 2, 1968  Japan.............................. 43-88261
Oct. 21, 1970  Japan.............................. 45-92658
Nov. 2, 1970  Japan.............................. 45-96703
Dec. 30, 1970  Japan............................ 45-128171

[52] U.S. Cl........................ 195/29, 195/30, 195/49
[51] Int. Cl.............................................. C12d 13/06

[58] Field of Search................ 195/28 R, 29, 30, 49

[56] References Cited
UNITED STATES PATENTS
3,671,397   6/1972   Sih........................................ 195/29

FOREIGN PATENTS OR APPLICATIONS
2,041,418   2/1971   Germany............................. 195/30

Primary Examiner—Alvin E. Tanenholtz
Assistant Examiner—Max D. Hensley

[57] ABSTRACT

3, 4-Dihydroxyphenyl-L-alanine, L-tyrosine and 2, 4-dihydroxyphenyl-L-alanine are obtained by the action of $\beta$-tyrosinase produced by cultivation of certain microorganisms, on catechol, phenol and resorcin, and cysteine, cystine, serine and alanine, or ammonia and pyruvic acid, oxalacetic acid, fumaric acid, malic acid, maleic acid, maleic oxime, glyoxylic acid, lactic acid or these derivatives.

16 Claims, No Drawings

BIOLOGICAL METHOD OF PRODUCING PHENOLIC AMINO ACIDS

This application is a continuation-in-part of our co-pending application Ser. No. 879,934, filed on Nov. 25, 1969, and now abandoned.

This invention relates to the production of phenylalanine derivatives by enzyme action.

An object of the invention is to produce phenylalanine derivatives by a biochemical method at low cost from easily available raw materials.

3, 4-Dihydroxyphenyl-L-alanine (hereinafter referred to as DOPA) is used in the treatment of Parkinson's disease, L-tyrosine is one of the essential amino acids, and 2, 4-dihydroxyphenyl-L-alanine is useful as a nutrient and food additive.

DOPA can be synthesized from intermediates, such as piperonyl aldehyde, vanillin, tyrosine and catechol, or can be obtained from seeds by extraction. DOPA is biochemically produced from catechol and L-tyrosine by means of β-tyrosinase produced by a microorganism belonging to the genus Escherichia L-tyrosine is produced on a commercial scale only by extraction of natural substances.

It has now been found that a phenol derivative of the formula:

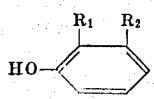

wherein $R_1$ and $R_2$ are hydrogen or hydroxyl, not more than one of said $R_1$, $R_2$ being hydroxyl, reacts with cysteine, cystine, serine S-lower-alkyl cysteine or, alanine and salts or esters of the these amino acids, or with ammonia and pyruvic acid, oxalacetic acid, malic acid, fumaric acid, maleic oxime, glyoxylic acid, or lactic acid and salts or esters thereof, in the presence of β-tyrosinase, to form phenylalanine derivatives of the formula:

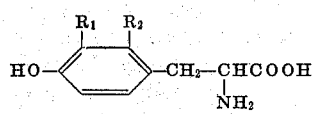

wherein $R_1$ and $R_2$ have the same meaning as described above in very high yield.

The enzyme, β-tyrosinase is known to catalyze the decomposition of L-tyrosine to phenol, pyruvic acid and ammonia. As mentioned above, β-tyrosinase also produces DOPA from catechol and L-tyrosine.

In the present invention, a suitable source of β-tyrosinase is mixed with an aqueous solution containing a phenol derivative and cysteine, cystine, serine, alanine and salts or derivatives thereof, or with an aqueous solution containing a phenol derivative, ammonia or pyruvic acid, oxalacetic acid, malic acid, fumaric acid, maleic oxime, glyoxylic acid, or lactic acid and salts or derivatives thereof, and the mixture is left to stand at pH 4 to 11 until the phenylalanine derivative is produced.

The β-tyrosinase source may be a broth in which a microorganism is cultivated, or a cell-free filtrate thereof, an aqueous suspensions of microbial cells, a suspension of ground cells, a filtrate of such a suspension, or a pure enzyme preparation.

The microorganisms capable of producing the enzyme are distributed widely and belong to the genera Escherichia, Aerobacter, Erwinia, Pseudomonas, Bacillus, Xanthomonas, Proteus, Citrobacter, Paracholobactrum, Salmonella and Alcaligenes. Typical species are Escherichia coli, Erwinia herbicola, Aerobacter aerogenes, Pseudomonas perlurida, Pseudomonas ovalis, Bacillus cereus, Bacillus megatherium, Xanthomonas campestris, Proteus mirabilis, Proteus morganii, Citrobacter freundii, Paracolobactrum coliforme, Salmonella gallinarum and Alcaligenes faecalis.

The media employed for culturing the microorganisms may be conventional, containing sources of assimilable carbon and nitrogen and the usual minor nutrients and also include a small amount of tyrosine. The microorganisms have been grown successfully on media containing carbohydrates such as glucose, fructose, sucrose, mannose, maltose, mannitol, xylose, galactose, starch hydrolyzate and molasses. Organic acids such as acetic acid, citric acid, lactic acid, fumaric acid, malic acid, α-ketoglutaric acid, gluconic acid and pyruvic acid, alcohols such as methanol, ethanol, propanol and butanol, fatty acids and hydrocarbons are also useful as main carbon sources or supplemental carbon sources for selected microorganisms. The concentration of the carbon source in the medium is normally between 0.1 and 10 percent by weight, based on glucose equivalents. Nitrogen may be provided by ammonium salts of inorganic or organic acids, such as hydrochloric, sulfuric, phosphoric, nitric, acetic and carbonic acid, by urea, and by ammonia in an aqueous solution or in the gaseous state. Other organic substances containing nitrogen such as corn steep liquor, yeast extract, peptone, meat extract and NZ-amine are employed as supplemental nitrogen sources.

The medium should also contain inorganic salts and minor organic nutrients which promote the growth of the microorganisms. The inorganic salts may include dipotassium hydrogen phosphate, potassium dihydrogen phosphate, magnesium sulfate, sodium chloride, ferrous sulfate, manganese sulfate, zinc sulfate, copper sulfate and calcium carbonate. Known organic growth promoting substances include amino acids generally, biotin, vitamins, organic acids, fatty acids and substances containing protein. They may be supplied by substances which yield the active agent under the conditions of culturing, such as meat extract, peptone, yeast extract, corn steep liquor, skim milk, chlorella extract, and soybean protein hydrolyzate.

Tyrosine should be added to the medium in an amount of more than 0.01 percent, and preferably from 0.05 to 0.5 percent (w/v). The tyrosine may be in the form of organic nutrients, such as amino acid mixture, polypeptone or soybean extract.

Amino acids such as methionine, glycine, and alanine, vitamins such as pyridoxine, pyridoxal, and pyridoxal phosphate are also added to the medium in order to improve the enzyme activity. The concentration of the amino acids added is normally between 0.01 and 5 percent by weight as free amino acids, and the vitamins are effective in an amount of more than 0.5 mg/dl.

The fermentation is carried out under aerobic conditions, at 25° to 40°C. It is preferred to adjust the pH of the culture medium to 5.5 to 8.5 during cultivation.

Culturing is generally carried out for 10 to 72 hours.

The broth may be used as an enzyme source as is, without removing the bacterial cells. A cell-free filtrate of the culture broth and a suspension of crushed bacterial cells prepared by trituration, autolysis or ultrasonic oscillation, are also used as enzyme sources for the present invention. Crude enzyme and pure enzyme recovered by centrifuging, salting out and solvent precipitation can also be used.

The phenolic amino acids may be prepared by adding a phenol and cysteine, cystine, serine, alanine or salts and derivatives thereof to the medium during cultivation.

The phenol derivatives which can be used as the starting materials of the present invention include catechol, resorcin and phenol.

The cysteine, cystine, serine and alanine are used each in the form of the free acid, the ammonium, sodium, potassium or calcium salt of the hydrochloride. Their esters, such as the ethyl ester or the methyl ester, and other derivatives may also be used as the sources of cysteine, cystine, alanine and serine. The amino acids may be used in the D-, L- or DL-form, and in mixtures of D- and L-forms. The concentration of the amino acids in the reaction system is usually not critical, but preferably from 0.1 to 10 percent as the free amino acids.

The amino acids can be replaced by ammonia and pyruvic acid, oxalacetic acid, malic acid, fumaric acid, maleic oxime, glyoxylic acid or lactic acid. The ammonia may be added in an amount of 0.1 to 10 percent by weight. The pyruvic acid, oxalacetic acid, malic acid, fumaric acid, maleic oxime, glyoxylic acid and lactic acid may be in the form of free acid, the ammonium, sodium, potassium or calcium salt, or the esters, such as the methyl ester or ethyl ester, and other derivatives may also be used. The ammonium salt is preferred. The acid is present in the reaction system in an amount of 0.1 to 20 percent (w/v) as the free acids.

The reaction is preferably carried out at pH 4 to 11 and at 10° to 50°C. The pH of the reaction system is maintained by the addition of calcium carbonate, ammonia, caustic alkali or phosphate buffer solution.

When catechol and resorcin are the phenol derivatives used to produce DOPA and 2, 4-dihydroxyphenyl-L-alanine, the yield can be greatly increased by adding a reducing agent and/or a chelating agent to the reaction system. Examples of reducing agents are sulfurous acid, sodium sulfite, potassium sulfite, ammonium sulfite, thiosulfuric acid, potassium thiosulfate, sodium thiosulfate, ammonium thiosulfate, cysteine, β-mercaptoethanol and ascorbic acid.

Examples of suitable chelating agents are EDTA, ethylenediamine, N-oxyethylenediamine, aspartic acid, N-dioxyethylglycine, nitrilotriacetate, citric acid and thioglycolic acid. The reducing agent and the chelating agents are generally used in an amount of 0.01 to 1 percent (w/v).

When catechol is used as the phenol derivative to produce DOPA, the yield of DOPA can be greatly increased by adding boric acid to the reaction system. The boric acid may be in the form of an alkali metal salt or alkaline earth metal salt, and used in an equimolecular amount or in a small excess over the catechol. The reducing agent and/or chelating agent may be present together with the boric acid in the reaction system.

The phenolic amino acids produced in the reaction mixture may be recovered by conventional methods. For example, DOPA can be recovered by the method described in the Journal of Biological Chemistry, Vol. 239, page 2,910, (1964).

EXAMPLE 1

An aqueous culture medium was prepared to contain 1 percent meat extract, 1 percent polypeptone, 0.5 percent sodium chloride, 0.2 percent L-tyrosine, and adjusted to pH 7.0. 40 ml batches of the solution were placed in 500 ml shaking flasks.

The aqueous media were inoculated with Citrobacter freundii ATCC 6750 cultured on bouillon agar slants at 28°C for 24 hours, and maintained at 31°C for 18 hours with shaking.

The microbial cells in one liter of the cultured broth were harvested by centrifuging, washed and suspended in 100 ml of dilution buffer which contained 0.05 M potassium phosphate (pH 6). The cell suspension was subjected to ultrasonic oscillation (20 kc, for 30 minutes) and centrifuged.

The supernatant solution was fractionated with ammonium sulfate, followed by dialysis against the dilution buffer. One tenth volume of a 6 percent protamine sulfate solution at pH 7.0 was added to the dialyzate and the precipitate formed was centrifuged off. The supernatant solution was applied to a DEAE sephadex column (6 × 53 cm) equilibrated with the dilution buffer. After the column was washed with 0.1 M potassium phosphate buffer, pH 7.0, containing 0.005 M mercaptoethanol, the enzyme was eluted with 0.1 M potassium phosphate buffer, pH 7.0, containing 0.005 M mercaptoethanol and 0.1 M KC1. The active fractions were combined and concentrated by the addition of ammonium sulfate (70 percent saturation). The precipitate was collected and dialyzed against the dilution buffer.

The dialyzate was applied to a hydroxylapatite column (5 × 10 cm) equilibrated with the dilution buffer. After the column was washed with 0.03 M potassium phosphate buffer, pH 6.0, containing 0.005 M mercaptoethanol, the enzyme was eluted with 0.1 M potassium phosphate buffer, pH 6.0, containing 0.005 M mercaptoethanol. The active fractions were combined and concentrated with ammonium sulfate (70 percent saturation). The precipitate was collected and dissolved in a minimum amount of the dilution buffer. The enzyme solution was passed through a sephadex G-150 column (2 × 100 cm) equilibrated with the dilution buffer. The active fractions containing enzyme of a specific activity greater than 1.0 were combined and concentrated with ammonium sulfate (70 percent saturation). The precipitate was dissolved in a minimal amount of the dilution buffer. Finely powdered ammonium sulfate was cautiously added to the enzyme solution until it became slightly turbid, and the mixture was placed in an ice bath. Crystallization began after about 6 hours and was virtually complete within a week.

80 MG of crystalline enzyme were obtained.

The enzyme was added to 200 ml of 0.05 M potassium phosphate buffer (pH 8.5) containing 2.5 g of catechol and 1 g of L-serine, and the mixture was held at 31°C for 3 hours. 870 mg of DOPA were then found in the solution.

Trichloroacetic acid was added to the solution in order to remove protein, and its pH was adjusted to 8.5 with aqueous ammonia. It was then applied to an aluminum oxide column (4 × 20 cm). This column was eluted first with distilled water, then with 0.3 N acetic acid. The eluate fraction containing DOPA was treated with ethyl acetate. The syrup obtained was applied to a silicic acid column, and the column was eluted. The eluate was evaporated and 560 mg of crystalline DOPA were obtained. When 1 g of L-cysteine was employed instead of L-serine, 1,250 mg of DOPA were found in the reaction solution and 830 mg of crystalline DOPA were obtained.

EXAMPLE 2

Aerobacter aerogenes ATCC 7256 was cultured in the same manner as in Example 1. The microbial cells in one liter of the cultured broth were harvested and suspended in 100 ml of dilution buffer which contained 0.05 M potassium phosphate (pH 6). The cell suspension was subjected to ultrasonic oscillation (20 Kc, for 30 minutes) and centrifuged.

The supernatant solution was employed as the enzyme source. The enzyme solution (containing 80 mg of protein) was added to 200 ml of 0.05 M potassium phosphate buffer (pH 8.5) containing 4 g of catechol, 2 g of L-cysteine and 4 mg of pyridoxal phosphate and reacted at 31°C for 3 hours. 1.2 G of DOPA were obtained in the reaction solution. 0.9 G of crystalline DOPA were obtained from the solution as in Example 1.

When 2 g of S-methylcysteine were employed instead of L-cysteine, 0.8 g of DOPA were found in the reaction solution and 0.4 g crystalline DOPA were obtained.

EXAMPLE 3

An aqueous culture medium having the following composition was prepared and adjusted to pH 6.5.

| | | |
|---|---|---|
| L-Tyrosine | 0.2 | g/dl |
| K₂HPO₄ | 0.1 | g/dl |
| MgSO₄ | 0.05 | g/dl |
| Citric acid | 0.2 | g/dl |
| Glycerol | 0.2 | g/dl |
| Yeast extract | 1.0 | g/dl |
| Pyridoxine | 10.0 | mg/dl |
| Glycine | 0.1 | g/dl |
| Alanine | 0.3 | g/dl |
| Methionine | 0.15 | g/dl |

60 ml Batches of the solution were placed in 500 ml shaking flasks.

The aqueous media were inoculated with Erwinia herbicola ATCC 21434 cultured on bouillon agar slants at 28°C for 20 hours and maintained, at 31°C for 20 hours with shaking.

The microbial cells in one liter of the cultured broth were harvested by centrifuging, and washed with distilled water. The cells were suspended in a solution having the following composition, a pH of 8.8, and one half of the volume of the original cultured broth.

| | | |
|---|---|---|
| DL-Serine | 1.5 | g/dl |
| Catechol | 0.75 | g/dl |
| Na₂SO₃ | 0.2 | g/dl |
| (NH₄)₂NO₃ | 0.2 | g/dl |
| EDTA | 0.1 | g/dl |

The reaction was carried out at 30°C for 20 hours. 0.92 g/dl of DOPA were found in the reaction solution.

Two liters of the solution were adjusted to pH 3.5 with hydrochloric acid and centrifuged to remove the microbial cells. The supernatant solution was concentrated to 250 ml, adjusted to about pH 1.0, and applied to a column containing 130 g of dried active carbon. After the column was washed with 0.1 N hydrochloric acid to remove residual L-serine, DOPA was eluted with diluted aqueous ammonia. Crude crystalline DOPA was obtained by concentrating the eluate, and was recrystallized three times. The yield of DOPA was 13.6 g. It was entirely in the L-form as determined by polarimeter.

EXAMPLE 4

Erwinia herbicola ATCC 21434 was cultured in the same manner as in Example 3. The microbial cells in one liter of cultured broth were harvested by centrifuging, and washed with distilled water. The cells (whose dry matter was 50 mg) were suspended in 100 ml of the solution mentioned in Example 3 with the exception that the amino acids listed in Table 1 were employed instead of DL-serine, and the reaction was carried out under the same conditions as in Example 3. The amount of DOPA produced is also shown in Table 1.

TABLE 1

| No. | amino acid | DOPA produced (g/100 ml) |
|---|---|---|
| 1 | L-Cysteine | 0.52 |
| 2 | D-Cysteine | 0.45 |
| 3 | L-Serine | 0.88 |
| 4 | D-Serine | 0.74 |
| 5 | L-Cystine | 0.32 |
| 6 | L-Alanine | 0.08 |
| 7 | D-Alanine | 0.04 |
| 8 | S-Methyl-L-Cysteine | 0.40 |
| 9 | S-Methyl-D-Cysteine | 0.32 |

EXAMPLE 5

Erwinia herbicola ATCC 21434 was cultured in the same matter as in Example 3. The microbial cells in one liter of the cultured broth were harvested. The cells (23 g in dry weight) were suspended in 100 ml of 0.5 M potassium phosphate buffer (pH 6.0), and the suspension was subjected to ultrasonic oscillation (20 kc, for 20 minutes) and centrifuged. The supernatant solution was employed as an enzyme source.

The enzyme source was added to 2 liters of solution containing 2.0 g/dl of D-serine, 1.0 g/dl of catechol, 0.2 g/dl of Na2SO3 and 0.1 g/dl of EDTA, and adjusted to pH 8.8 with aqueous ammonia. After the reaction was carried out at 30°C for 20 hours, 0.84 g/dl of DOPA were found in the solution. 10.6 g of crystalline DOPA were obtained in the same manner as in Example 3. Example 6.

60 ml batches of aqueous media A – D listed in Table 2 were inoculated with Erwinia herbicola ATCC 21433 cultured on bouillon agar slants at 28°C for 20 hours, and maintained at 31°C for 20 hours with shaking. The microbial cells in 10 ml of the broth were harvested by centrifuging, and suspended in 5 ml of a solution of pH 8.8 having the following composition: 2.0 g/dl of L-serine, 1.0 g/dl of catechol, 0.1 g/dl of EDTA and 0.2 g/dl of Na2SO3.

After the reaction was carried out at 30°C for 20 hours, DOPA produced in each reaction solution was estimated. The results are shown in Table 2.

TABLE 2

|  | A(g/dl) | B(g/dl) | C(g/dl) | D(g/dl) |
|---|---|---|---|---|
| L-Tyrosine | 0.2 | 0.2 | 0.2 | 0.2 |
| $KH_2PO_4$ | 0.1 | 0.1 | 0.1 | 0.1 |
| $MgSO_4$ | 0.05 | 0.05 | 0.05 | 0.05 |
| Pyridoxine | 0 | 0.01 | 0 | 0.01 |
| Glycerol | 0.2 | 0.2 | 0.2 | 0.2 |
| Citric acid | 0.2 | 0.2 | 0.2 | 0.2 |
| DL-Methionine | 0 | 0 | 0.1 | 0.1 |
| Glycine | 0.1 | 0.1 | 0.1 | 0.1 |
| DL-Alanine | 0.2 | 0.2 | 0.2 | 0.2 |
| Yeast extract | 1.0 | 1.0 | 1.0 | 1.0 |
| PH (adjusted with KOH) | 6.5 | 6.5 | 6.5 | 6.5 |
| DOPA produced (g/dl) | 0.22 | 0.58 | 0.42 | 0.88 |

EXAMPLE 7

An aqueous culture medium having the following composition was prepared and adjusted to pH 6.5.

| Meat extract | 0.3 % |
|---|---|
| Polypeptone | 0.3 % |
| Yeast extract | 0.2 % |
| Sodium chloride | 0.2 % |
| L-Tyrosine | 0.05 % |
| L-Serine | 0.05 % |
| L-Cysteine | 0.02 % |
| L-Alanine | 0.02 % |

40 ml batches of the solution were placed in 500 ml shaking flasks.

The aqueous media were inoculated with Citrobacter freundii ATCC 6750, Achromobacter candicans OUT 8005, Proteus mirabilis ATCC 15290 and Xanthomonas campestris ATCC 7381 respectively and maintained, at 31°C for 18 hours with shaking.

The microbial cells in one liter of each broth were harvested by centrifuging, suspended in 100 ml of 0.05M potassium phosphate buffer (pH 6.0), and subjected to ultrasonic oscillation (20 Kc, for 20 minutes). The resulting suspensions of cell fragments were employed as enzyme sources.

Each enzyme source (100 mg in dry matter) was added to 100 ml of a solution (pH 7.8) containing 200 mg of an amino acid listed in Table 3, 400 mg of catechol and 2.5 mg of pyridoxal phosphate, and the mixture was maintained at 31°C for 3 hours. DOPA was produced in each reaction solution as indicated in the Table.

TABLE 3

| Microorganisms employed | DOPA produced (mg/dl) Substrate | | | |
|---|---|---|---|---|
|  | L-Cysteine | L-Cystine | L-Serine | L-Alanine |
| Citrobacter freundii ATCC 6750 | 180 | 65 | 140 | 15 |
| Achromobacter candicans OUT 8005 | 130 | 43 | 105 | 12 |
| Proteus mirabilis ATCC 15290 | 103 | 35 | 72 | 8 |
| Xanthomonas campestris ATCC 7381 | 82 | 25 | 45 | 5 |

EXAMPLE 8

An aqueous culture medium having the following composition was prepared and adjusted to pH 7.0.

| Glucose | 2 % |
|---|---|
| $(NH_4)_2SO_4$ | 1 % |
| $KH_2PO_4$ | 0.2 % |
| $MgSO_4$ | 0.1 % |
| FE ++ | 2 ppm |
| Mn ++ | 2 ppm |
| Yeast extract | 0.1 % |
| Corn steep liquor | 0.05 % |
| L-Tyrosine | 0.05 % |
| L-Serine | 0.05 % |
| L-Cysteine | 0.05 % |
| $CaCO_3$ (sterilized separately) | 2.5 % |

20 ml batches of the solution were placed in 500 ml shaking flasks.

The aqueous media were inoculated with the microorganisms listed in Table 4 and maintained at 31°C for 24 hours with shaking, whereupon 0.5 percent catechol and 0.2 % L-serine or L-cysteine were added to the broth, and the reaction was carried out for 24 hours. The amount of DOPA produced was estimated by the method of Arnow et al. as follows:

TABLE 4

| Microorganisms employed | DOPA produced (mg/dl) Substrate | |
|---|---|---|
|  | L-Serine | L-Cysteine |
| Aerobacter aerogenes ATCC 7256 | 85 | 105 |
| Citrobacter freundii ATCC 6750 | 108 | 135 |
| Achromobacter candicans OUT 8005 | 62 | 82 |
| Proteus mirabilis ATCC 15290 | 78 | 98 |
| Xanthomonas campestris ATCC 7381 | 69 | 85 |
| Pseudomonas ovalis IAM 1622 | 42 | 70 |
| Bacillus cereus IAM 1229 | 55 | 72 |

EXAMPLE 9

An aqueous culture medium having the following composition was prepared and adjusted to pH 6.5.

| Meat extract | 0.3 % |
|---|---|
| Polypeptone | 0.3 % |
| Yeast extract | 2.0 % |
| DL-Alanine | 0.3 % |
| L-Tyrosine | 0.2 % |
| Glycine | 0.1 % |
| Citric acid | 0.2 % |
| Casein hydrolyzate | 0.3 % |

60 ml batches of the solution were placed in 500 ml shaking flasks.

The aqueous media were inoculated with the microorganisms listed in Table 5 and maintained at 31°C for 20 hours with shaking.

The microbial cells in one liter of each broth were harvested by centrifuging and added to 100 ml of 0.05 M potassium phosphate buffer (pH 8.5).

Each enzyme source so obtained (0.5 g in dry matter) was added to 100 ml of 0.05 M potassium phosphate buffer containing 1 g of D-serine, 1 g of D-cysteine, 1 g of D-cystine, 1 g of D-tyrosine or 3 g of D-alanine, together with 0.8 g of catechol and 0.2 g of $Na_2SO_3$ at pH 8.6, and the mixtures were maintained at 31°C for 20 hours. The DOPA produced in the reaction is listed in Table 5.

TABLE 5

| Microorganisms employed | DOPA produced (g/dl) Substrate | | | |
|---|---|---|---|---|
| | D-Cysteine | D-Cystine | D-Serine | D-Alanine |
| Citrobacter freundii ATCC 6750 | 0.46 | 0.25 | 0.52 | 0.15 |
| Citrobactor freundii ATCC 8090 | 0.32 | 0.20 | 0.44 | 0.06 |
| Escherichia coli ATCC 3655 | 0.35 | 0.21 | 0.32 | 0.05 |
| Proteus mirabilis ATCC 15290 | 0.10 | 0.05 | 0.08 | 0.02 |

EXAMPLE 10

A culture medium containing 0.2 g/dl L-tyrosine, 0.1 g/dl potassium dihydrogenphosphate, 0.05 g/dl magnesium sulfate, 0.7 g/dl fumaric acid, 0.2 g/dl glucose, 1.0 g/dl yeast extract, 0.5 g/dl meat extract and 0.01 g/dl pyridoxine was prepared, the pH of the medium was adjusted to 8.0 with KOH solution, and sterilyzed at 110°C for 5 minutes. 60 ML batches of the medium were inoculated with Erwinia herbicola ATCC 21433 which had previously been cultured on a peptone-agar slant at 28°C for 20 hours, and cultured at 31°C for 24 hours with shaking.

Two liters of the culture broth were centrifuged to collect bacterial cells, the cells were added to a 2 l solution containing 1.0 g/dl ammonium pyruvate, 1.0 g/dl phenol and 1.0 g/dl ammonium acetate, and the mixture was left to stand at pH 8.0, at 37°C for 20 hours. The reaction mixture was found to contain 0.8 g/dl L-tyrosine.

Precipitate of tyrosine in 2 l of the reaction mixture was dissolved by adding 3N-HCl solution, and the resultant solution was centrifuged in the presence of diatomaceous earth. The pH of the supernatant solution was adjusted to 6.0 with 3N-NaOH solution, the solution was cooled in an ice-box overnight, and precipitated tyrosine was recovered by centrifugation. The precipitate was washed with water, recrystallized from acid and alkali solution, and washed with acetone to give 12 g pure crystalline tyrosine.

100 γ of the material was spotted on a filter paper, developed by butanol:acetic acid:water = 4:2:1 solvent system, and the single spot obtained was identified as tyrosine by the ninhydrin reaction and Millon's reaction. The tyrosine was confirmed to be in the 100 percent L-form by measuring its optical rotation.

A similar reaction was performed with 2.0 g/dl oxalacetic acid and 2.0 g/dl ammonium acetate in place of 1.0 g/dl ammonium pyruvate and 1.0 g/dl ammonium acetate, and the reaction mixture was found to contain 0.7 g/dl L-tyrosine.

EXAMPLE 11

Erwinia herbicola ATCC 21433 was cultured in the same way as in Example 10, bacterial cells obtained from 4 liter of the broth were added to a 2 liter solution containing 1.0 g/dl pyruvic acid, 1.0 g/dl catechol, 1.0 g/dl ammonium acetate and 0.2 g/dl potassium sulfite, of pH 8.0, and the mixture was reacted at 22°C for 24 hours. The reaction was found to contain 0.4 g/dl DOPA.

The pH of the 2 l reaction mixture was adjusted to 3.5 with 3N-HCl, the mixture was heated at 110°C for 5 minutes, and cells were removed by centrifugation. The supernatant was concentrated to 300 ml, the pH of the concentrated solution was adjusted to 1.0, and the solution was passed through a column packed with active charcoal. 0.1N-HCl was introduced to the column to elute byproduct amino acids and DOPA was eluted with diluted ammonia containing 0.2 percent sodium sulfite. The eluate was concentrated, a precipitate of DOPA formed and was dissolved by adding HCl, and the solution was concentrated. Precipitated DOPA was washed with water three times, and 6 g DOPA were obtained. The DOPA was found to be in the L-form.

A similar reaction was carried out using 2.0 g/dl oxalacetic acid and 2.0 g/dl ammonium acetate in place of 1.0 g/dl ammonium pyruvate and 1.0 g/dl ammonium acetate, and the reaction mixture was found to contain 0.6 g/dl DOPA.

EXAMPLE 12

Bacterial cells of Erwinia herbicola ATCC 21433 obtained from 4 l of the culture medium were added to a 2 liter solution containing 1.0 g/dl ammonium pyruvate, 1.0 g/dl resorcin, 1.0 g/dl ammonium acetate and 0.2 g/dl sodium sulfite, of pH 8.0, and the mixture was reacted at 22°C for 24 hours. The reaction mixture was found to contain 0.4 g/dl 2, 4-dihydroxyphenyl-L-alanine.

Protein in the reaction mixture was removed by adding trichloroacetic acid, the resultant solution was treated with anion exchange resin "Dowex-50," and then with active charcoal, and crude crystalline 2, 4-dihydroxyphenylalanine was obtained. The crude crystals were washed with aqueous ethanol to give 5.3 g pure 2, 4-dihydroxyphenylalanine identified by elementary analysis and NMR spectrum. It was confirmed to be in the L-form by its optical rotation.

A similar reaction was performed by using 2.0 g/dl oxalacetic acid and 2.0 g/dl ammonium acetate in place of 1.0 g/dl ammonium pyruvate and 1.0 g/dl ammonium acetate, and the reaction mixture was found to contain 0.4 g/dl 2, 4-dihydroxyphenyl-L-alanine.

EXAMPLE 13

Bacterial cells obtained from 100 ml culture broth of Erwinia herbicola ATCC 21433 which had been cultured as in Example 10 were added to 50 ml batches of the following solutions (I), (II), (III) and (IV), and were reacted at 37°C for 24 hours.

```
Solution (I)
    Pyruvic acid                       1.0 g/dl
    (NH4)2SO4                          1.5 g/dl
    Phenol                             1.0 g/dl
    Ammonium acetate                   0.5 g/dl
        pH:8.0 (adjusted with NH4OH)
Solution (II)
    Pyruvic acid                       1.0 g/dl
    Phenol                             1.0 g/dl
        pH:8.0 (adjusted with NH4OH)
Solution (III)
    Potassium pyruvate                 1.0 g/dl
    Phenol                             1.0 g/dl
    Ammonium acetate                   2.0 g/dl
        pH:8.0 (adjusted with NH4OH)
Solution (IV)
    Potassium pyruvate                 1.0 g/dl
    Phenol                             1.0 g/dl
        pH:8.0 (adjusted with KOH)
```

L-Tyrosine was found to be produced in an amount of 0.7 g/dl in the solution (I), 0.9 g/dl in the solution (II), and 0.9 g/dl in the solution (III), but no tyrosine was found in the solution (IV), for lack of ammonium ions.

EXAMPLE 14

Bacteria listed in Table 6 were cultured in 60 ml batches of a culture medium containing 0.2 g/dl tyrosine, 0.1 g/dl potassium dihydrogenphosphate, 0.05 g/dl magnesium sulfate, 0.6 g/dl glycerol, 0.5 g/dl succinic acid, 2.0 g/dl yeast extract, 0.5 g/dl meat extract and 0.01 g/dl pyridoxine, of pH 7.5 at 31°C for 24 hours with shaking.

Each culture broth was centrifuged to isolate bacterial cells, the cells obtained from 100 ml broth were added to 50 ml batches of the following solutions (I), (II) and (III), and the reaction system in the solution (I) was kept at 37°C for 20 hours, and the reaction systems in the solutions (II) and (III) were kept at 20°C for 20 hours. The amounts of phenylalanine derivatives produced are listed in Table 6.

```
Solution (I)
    Potassium pyruvate                 2.0 g/dl
    Phenol                             1.0 g/dl
    Ammonium acetate                   2.0 g/dl
        pH:8.0 (adjusted with NH4OH)
Solution (II)
    Potassium pyruvate                 2.0 g/dl
    Catechol                           1.0 g/dl
    Ammonium acetate                   2.0 g/dl
    Na2SO3                             0.2 g/dl
        pH:8.0 (adjusted with NH4OH)
Solution (III)
    Potassium pyruvate                 2.0 g/dl
    Resorcin                           1.0 g/dl
    Ammonium acetate                   2.0 g/dl
    Na2SO3                             0.2 g/dl
        pH:8.0 (adjusted with NH4OH)
```

TABLE 6

| Bacteria used | Amount of phenolic amino acid produced | | |
|---|---|---|---|
| | L-Tyrosine (g/dl) | DOPA (g/dl) | 2,4-DiOH-Phe (g/dl) |
| Erwinia herbicola ATCC 21433 | 1.2 | 0.8 | 0.7 |
| Citrobacter freundii ATCC 6750 | 0.9 | 0.6 | 0.5 |
| Escherichia coli ATCC 3655 | 0.8 | 0.5 | 0.4 |
| Citrobacter freundii ATCC 8090 | 0.5 | 0.3 | 0.4 |
| Proteus morganii IFO 3848 | 0.5 | 0.3 | 0.3 |
| Proteus mirabilis ATCC 15290 | 0.4 | 0.3 | 0.3 |
| Pseudomonas perlurida ATCC 490 | 0.3 | 0.2 | 0.2 |
| Aerobacter aerogenes ATCC 7256 | 0.3 | 0.2 | 0.2 |
| Salmonella gallinarum ATCC 9148 | 0.5 | 0.4 | 0.2 |
| Paracolobactrum coliforme ATCC 11605 | 0.4 | 0.3 | 0.2 |
| Xanthomonas campestris ATCC 7381 | 0.4 | 0.2 | 0.1 |
| Alcaligenes faecalis ATCC 8315 | 0.3 | 0.1 | 0.1 |

Similar reactions were carried out with 2.0 g/dl oxalacetic acid in place of potassium pyruvate in the solution (I) to (III), and the results obtained are listed in Table 7.

TABLE 7

| Bacteria used | Amount of phenolic amino acid produced | | |
|---|---|---|---|
| | L-Tyrosine (g/dl) | DOPA (g/dl) | 2,4-DiOH-Phe (g/dl) |
| Erwinia herbicola ATCC 21433 | 1.0 | 0.8 | 0.6 |
| Citrobacter freundii ATCC 6750 | 0.8 | 0.6 | 0.5 |
| Proteus mirabilis ATCC 15290 | 0.8 | 0.5 | 0.5 |
| Pseudomonas perlurida ATCC 490 | 0.5 | 0.5 | 0.5 |
| Aerobacter aerogenes ATCC 7256 | 0.5 | 0.5 | 0.5 |
| Salmonella gallinarum ATCC 9148 | 0.5 | 0.3 | 0.3 |
| Citrobacter freundii ATCC 8090 | 0.4 | 0.2 | 0.3 |
| Paracolobactrum coliforme ATCC 11605 | 0.4 | 0.2 | 0.2 |
| Xanthomas campestris ATCC 7381 | 0.3 | 0.2 | 0.2 |
| Alcaligenes faecalis ATCC 8315 | 0.3 | 0.2 | 0.1 |

EXAMPLE 15

Citrobacter freundii ATCC 6750 was cultured in the same way as in Example 14, 10 l of the culture broth were centrifuged to collect bacterial cells, and the cells obtained were crushed in a 0.05 M phosphate buffer solution of pH 6.0 by ultrasonic waves of 20 kilocycles for 20 minutes. The resultant solution was centrifuged to remove bacterial cells, enzyme in the supernatant was precipitated by adding ammonium sulfate, and refined by treating with protamin, DEAE-cellulose and Cephadex-150, as in Example 1. 50 Mg (as protein) of the enzyme obtained were added to 100 ml of a solution containing 2.0 g/dl sodium pyruvate, 1.3 g/dl phenol, 1.0 g/dl ammonium acetate, 2.0 g/dl ammonium sulfate and 2 mg/dl pyridoxal phosphate, of pH 8.0, and the mixture was kept at 37°C for 20 hours. The reaction mixture was found to contain 1.6 g/dl L-tyrosine.

EXAMPLE 16

Citrobacter freundii ATCC 6750 was cultured in the same way as in Example 14, 0.7 g phenol, 2.0 g potassium pyruvate and 2.0 g ammonium acetate were added to 100 ml of the culture broth, and the pH of the mixture was adjusted to 8.0 with ammonia water. The mixture was incubated at 37°C, and 0.4 g phenol was added to the mixture every 2 hours after the incubation 10 times. 10 G pyruvic acid and 1.0 g ammonium acetate were added to the mixture at 4 hours and 8 hours from the beginning of the incubation, and the reaction was performed for a total 42 hours. The reaction mixture was found to contain 5.2 g/dl L-tyrosine.

100 ML of the culture broth prepared as above were mixed with 4.7 g phenol, 4.0 g potassium pyruvate and 5.0 g ammonium acetate, and the pH of the mixture was adjusted to 8.0. The resultant mixture was kept at 37°C for 42 hours, and the reaction mixture was found to contain 1.8 g/dl L-tyrosine.

A similar reaction was carried out with oxalacetic acid in place of potassium pyruvate and 4.0 g of the initial ammonium acetate in place of 2.0 g of the initial acetate, the reaction was performed while supplementing the substrates, and the reaction mixture was found to contain 4.2 g/dl L-tyrosine.

100 ML of the culture broth was mixed with 4.7 g phenol, 4.0 g oxalacetic acid and 6.0 g ammonium acetate, th pH of the mixture was adjusted to 8.0 with ammonia awater, and reacted at 37°C for 42 hours. The reaction mixture was found to contain 1.8 g/dl L-tyrosine.

It appears from the results of the above two sets of reactions that the reaction of the present invention may be inhibited by the substrates.

EXAMPLE 17

100 ML culture broth of Citrobacter freundii ATCC 6750 which had been prepared in the same way as in Example 14 were mixed with 0.6 g catechol, 2.0 g sodium pyruvate, 2.0 g ammonium acetate, 0.2 g sodium sulfite and 0.2 g EDTA, the pH of the mixture was adjusted to 8.0 with ammonia water, and the reaction system was permitted to react at 17°C. After 4 hours from the beginning of the reaction, catechol was supplemented to maintain the initial amount, and 2.8 g catechol were consummd in 42 hours. 1.0 G sodium pyruvate and 1.0 g ammonium acetate were added to the reaction system after 8 hours from the beginning of the reaction, and 1.0 g ammonium acetate was added after 12 hours. The reaction mixture was found to contain 2.5 g/dl DOPA.

100 ML culture broth of Citrobacter freundii ATCC 6750 were mixed with 3.0 g sodium pyruvate, 4.0 g ammonium acetate, 0.2 g sodium sulfite and 0.2 g EDTA, the pH of the resultant mixture was adjusted to 8.0 with ammonia water, and the reaction system was kept at 17°C for 42 hours. The reaction mixture was found to contain 0.4 g/dl DOPA.

EXAMPLE 18

A culture medium containing 0.2 g/dl L-tyrosine, 0.1 g/dl potassium dihydrogen phosphate, 0.05 g/dl magnesium sulfate, 0.7 g/dl fumaric acid, 0.6 g/dl glycerol, 0.5 g/dl yeast extract and 0.01 g/dl pyridoxine was prepared, the pH of the medium was adjusted to 7.5 with KOH solution and the medium was sterilized at 110°C for 5 minutes in an autoclave. Erwinia herbicola ATCC 21433 which had previously been cultured on a nutrient-agar slant at 28°C for 20 hours was inoculated on a 60 ml medium prepared above, and cultured at 30°C for 24 hours with shaking.

100 ML of the culture broth were centrifuged to collect bacterial cells, the cells were added to 50 ml batches of solutions (A), (B), (C) and (D), and the solutions were kept at 22°C for 20 hours.

| | |
|---|---|
| Solution (A) | |
| Ammonium pyruvate | 2.0 g/dl |
| Catechol 1.0 g/dl | |
| Ammonium acetate | 2.0 g/dl |
| Na$_2$SO$_3$ | 0.2 g/dl |
| pH:8.0 (with NH$_4$OH) | |
| Solution (B) | |
| Ammonium pyruvate | 2.0 g/dl |
| Catechol | 1.0 g/dl |
| Ammonium acetate | 2.0 g/dl |
| EDTA | 0.2 g/dl |
| pH:8.0 (with NH$_4$OH) | |
| Solution (C) | |
| Ammonium pyruvate | 2.0 g/dl |
| Catechol | 1.0 g/dl |
| Ammonium acetate | 2.0 g/dl |
| Na$_2$SO$_3$ | 0.2 g/dl |
| EDTA | 0.2 g/dl |
| pH:8.0 (with NH$_4$OH) | |
| Solution (D) | |
| Ammonium pyruvate | 2.0 g/dl |
| Catechol | 1.0 g/dl |
| Ammonium acetate | 2.0 g/dl |
| pH:8.0 (with NH$_4$OH) | |

The amounts of DOPA produced in the solutions were as follows.

| Reaction system | Amount of DOPA produced (g/dl) |
|---|---|
| Solution (A) | 1.2 |
| Solution (B) | 0.8 |
| Solution (C) | 1.6 |
| Solution (D) | 0.7 |

Bacterial cells of Erwinia herbicola ATCC 21433 obtained from 100 ml culture broth were added to batches of a 50 ml solution containing 2.0 g/dl ammonium pyruvate, 1.0 g/dl resorcin and 2.0 g/dl ammonium acetate, the pH of the mixture was adjusted to 8.0 with ammonia water, and the reaction was permitted to proceed at 17°C for 42 hours in the presence or absence of 0.2 g/dl Na$_2$SO$_3$ and 0.2 g/dl EDTA. L-2, 4-Dihydroxyphenyl-L-alanine was produced in an amount of 1.2 g/dl in the reaction mixture containing sodium sulfite and EDTA and 0.4 g/dl in the absence of the sodium sulfite and EDTA.

EXAMPLE 19

Bacterial cells obtained from 100 ml culture broth of bacteria listed in Table 8 were added to 30 ml solutions containing 2.0 g/dl of oxalacetic acid, malic acid, fumaric acid, glyoxylic acid, lactic acid or maleic oxime, 1.0 g/dl phenol and 2.0 g/dl ammonium acetate, the pH of the mixtures was adjusted to 8.0, and they were kept at 37°C for 20 hours. The amounts of L-tyrosine produced in the reaction mixtures are listed in Table 8.

EXAMPLE 21

An enzyme of Citrobacter freundii ATCC 6750 was prepared in the same way as in Example 15, and is referred to as Enzyme (A). An oxalacetate decarboxylase was prepared from the cells of Citrobacter freundii ATCC 6750 by the procedures described in D. Herbert; Symposia Soc. Exp. Biol., volume 5, page 52, (1951), and is referred to as Enzyme (B). An oxalacetate decarboxylase was also prepared from the cells of Micrococcus lysodeikticus in the same way as from the Citrobacter freundii, and is referred to as Enzyme (C).

50 MG (as protein) Enzyme (A) and 50 mg Enzyme (B), or 50 mg Enzyme (A) and 50 mg Enzyme (C)

TABLE 8

| | | | Amount of Tyr. produced from (g/dl) | | | |
|---|---|---|---|---|---|---|
| | Oxal-AcOH | Malic acid | Fumaric acid | Glyoxylic acid | Lactic acid | Maleic oxime |
| Erwinia herbicola ATCC 21433 | 1.50 | 0.62 | 0.38 | 0.48 | 0.95 | 0.52 |
| Citrobacter freundii ATCC 6750 | 1.08 | 0.78 | 0.30 | 0.45 | 0.62 | 0.68 |
| Proteus mirabilis ATCC 15290 | 0.88 | 0.80 | 0.30 | 0.50 | 0.55 | 0.70 |
| Pseudomonas perlurida ATCC 490 | 0.52 | 0.40 | 0.42 | 0.35 | 0.48 | 0.30 |
| Salmonella gallinarum ATCC 9148 | 0.82 | 0.88 | 0.52 | 0.32 | 0.71 | 0.77 |
| Citrobacter freundii ATCC 8090 | 1.02 | 0.70 | 0.28 | 0.45 | 0.82 | 0.60 |
| Paracolobactrum coliforme ATCC 11605 | 0.80 | 0.52 | 0.25 | 0.40 | 0.55 | 0.40 |
| Xanthomonas campestris ATCC 7381 | 0.66 | 0.21 | 0.15 | 0.32 | 0.35 | 0.11 |
| Alcaligenes faecalis ATCC 8315 | 0.31 | 0.20 | 0.31 | 0.21 | 0.21 | 0.11 |
| Aerobacter aerogenes ATCC 7256 | 0.42 | 0.20 | 0.45 | 0.48 | 0.20 | 0.15 |

EXAMPLE 20

100 ML culture broth of Erwinia herbicola ATCC 21433 which had been prepared in the same way as in Example 10, were centrifuged, bacterial cells obtained were added to 50 ml batches of the following solutions (A), (B), and (C), and the mixtures were kept at 37°C for 24 hours.

| Solution (A) | |
|---|---|
| Oxalacetic acid | 2.0 g/dl |
| Ammonium acetate | 2.0 g/dl |
| pH:8.0 (adjusted with NH₄OH) | |
| Solution (B) | |
| Oxalacetic acid | 2.0 g/dl |
| Phenol | 1.0 g/dl |
| Ammonium acetate | 2.0 g/dl |
| pH:8.0 (NH₄OH) | |
| Solution (C) | |
| Sodium pyruvate | 2.0 g/dl |
| Phenol | 1.0 g/dl |
| Ammonium acetate | 2.0 g/dl |
| pH:8.0 (NH₄OH) | |

The reaction mixtures obtained were analyzed for their pyruvic acid and L-tyrosine contents, and the results obtained were as follows:

| | Amount of | |
|---|---|---|
| Reaction mixture | Pyruvic acid (g/dl) | L-tyr. (g/dl) |
| Solution (A) | 1.1 | 0 |
| Solution (B) | 0.3 | 0.9 |
| Solution (C) | 0.5 | 1.3 | were added to 100 ml aqueous solutions containing 2.0 g/dl oxalacetic acid, 1.0 g/dl phenol, 1.0 g/dl ammonium acetate, 2.0 g/dl ammonium sulfate and 2 mg/dl pyridoxal phosphate, of pH 8.0, and the mixtures were kept at 37°C for 20 hours.

The reaction mixture of the Enzymes (A) and (B) was found to contain 1.2 g/dl L-tyrosine, and that of the Enzymes (A) and (C) contained 1.4 g/dl L-tyrosine.

EXAMPLE 22

Erwinia herbicola ATCC 21433 was cultured in the same way as in Example 18, 100 ml of the culture broth was mixed with 0.6 g catechol, 2.0 g lactic acid, 2.0 g ammonium acetate, 0.2 g sodium sulfite and 0.2 g EDTA, the pH of the mixture was adjusted to 8.0 with ammonia water, and the reaction was permitted to start at 17°C. Catechol was added to the reaction system every four hours to make its concentration 0.6 g/dl, 1.0 g lactic acid and 2.0 g ammonium acetate were supplemented 8 hours after the beginning of the reaction, and the incubation was performed for 42 hours.

Similar incubations were performed supplementing catechol to make its concentration 0.3 g/dl, 1.0 g/dl and 1.5 g/dl. The results obtained were as follows:

| Catechol concentration when supplemented | Amount of catechol consumed (g/dl) | Amount of DOPA produced (g/dl) |
|---|---|---|
| 0.3 | 2.5 | 1.25 |
| 0.6 | 3.2 | 1.80 |
| 1.0 | 3.6 | 2.15 |
| 1.5 | 2.3 | 1.05 |

100 ML culture broth of Erwinia herbicola ATCC 21433 were mixed with 3.0 g lactic acid, 4.0 g ammonium acetate, 0.2 g sodium sulfite and 0.2 g EDTA, the resultant mixture was mixed with 1.0 g, 1.5 g, 2.0 g, or 2.5 g catechol, and the mixture was permitted to react at pH 8.0 and at 17°C for 42 hours. The DOPA produced in the reaction mixtures were as follows:

| Amount of catechol added (g/dl) | Amount of DOPA produced (g/dl) |
|---|---|
| 1.0 | 0.84 |
| 1.5 | 0.65 |
| 2.0 | 0.34 |
| 2.5 | 0.21 |

EXAMPLE 23

Erwinia herbicola ATCC 21433 was cultured in the same way as in Example 18, bacterial cells were recovered from 2 l of the culture broth, and the cells were added to a solution containing catechol as indicated in Table 9, 3.0 g/dl DL-serine and 2.2 g/dl boric acid. The pH of the mixture was adjusted to 8.0 with ammonia water, and the mixture was stirred at 15°C for 24 hours. The amounts of DOPA produced in the reaction mixtures are listed in Table 9.

TABLE 9

| Amount of catechol added (g/dl) | | Boric acid | Amount of DOPA produced (g/dl) |
|---|---|---|---|
| Initial | During incubation | | |
| 0.6 | 0 | absent | 0.72 |
| 1.0 | 0 | absent | 1.05 |
| 1.5 | 0 | absent | 0.42 |
| 2.0 | 0 | absent | 0.22 |
| 4.0 | 0 | present | 2.40 |
| 0.5 | 0.5×3 | absent | 1.58 |

One liter of the reaction mixture containing 2.45 g/dl DOPA was treated in the same way as described in Example 11, and 11.2 g pure crystalline DOPA were obtained.

EXAMPLE 24

Bacterial cells of Erwinia herbicola ATCC 21433 which had been cultured as in Example 18 and isolated from 2 l of the culture broth were added to one liter solution containing 4.0 g/dl catechol, 3.0 g/dl pyruvic acid, 2.2 g boric acid and 2.0 g ammonium phosphate, of which pH was adjusted to 8.0 with ammonia water, and the mixture was stirred at 15°C for 24 hours. The reaction mixture was found to contain 2.8 g/dl DOPA. The reaction mixture was treated to give 13 g pure crystalline DOPA in the same way as in Example 11.

EXAMPLE 25

Citrobacter freundii ATCC 6750 was cultured on a medium as of the Example 18, and cultured at 27°C for 24 hours with shaking. Bacterial cells isolated from 100 ml culture broth were added to 50 ml each of solutions (I) to (VII) whose compositions are shown below, and the mixtures were permitted to react at 20°C for 20 hours.

Solution (I)
Catechol 4.0 g/dl
Sodium pyruvate 3.6 g/dl
Ammonium acetate 4.0 g/dl
Boric acid 2.2 g/dl
Na$_2$SO$_3$ 0.2 g/dl
EDTA 0.3 g/dl
pH:8.0 with NH$_4$OH Solution (II)
Catechol 4.0 g/dl
Sodium pyruvate 3.6 g/dl
Ammonium acetate 4.0 g/dl
Na$_2$SO$_3$ 0.2 g/dl
EDTA 0.3 g/dl
pH:8.0 with NH$_4$OH Solution (III)
Catechol 1.0 g/dl
Sodium pyruvate 3.6 g/dl
Ammonium acetate 4.0 g/dl
Na$_2$SO$_3$ 0.2 g/dl
EDTA 0.3 g/dl
pH:8.0 with NH$_4$OH Solution (IV)
Catechol: 0.5 g was added 4 times every 4 hours from the incubation
Pyruvic acid 3.6 g/dl
Ammonium acetate 4.0 g/dl
Na$_2$SO$_3$ 0.2 g/dl
EDTA 0.3 g/dl
pH:8.0 with NH$_4$OH Solution (V)
Catechol 4.0 g/dl
Pyruvic acid 3.6 g/dl
Ammonium acetate 4.0 g/dl
Boric acid 2.2 g/dl
pH:8.0 with NH$_4$OH Solution (VI)
Catechol 4.0 g/dl
Pyruvic acid 3.6 g/dl
Ammonium acetate 4.0 g/dl
Boric acid 2.2 g/dl
Na$_2$SO$_3$ 0.2 g/dl
pH:8.0 with acetic acid Solution (VII)
Catechol 4.0 g/dl
Pyruvic acid 3.6 g/dl
Ammonium acetate 4.0 g/dl
Boric acid 2.2 g/dl
EDTA 0.3 g/dl
pH:8.0 with NH$_4$OH The results obtained are listed in Table 10.

TABLE 10

| Reaction mixture | Amount of DOPA produced (g/dl) |
|---|---|
| Solution (I) | 2.52 |
| Solution (II) | 0.23 |
| Solution (III) | 1.32 |
| Solution (IV) | 1.80 |
| Solution (V) | 1.45 |
| Solution (VI) | 1.86 |
| Solution (VII) | 1.68 |

EXAMPLE 26

Catechol and boric acid were dissolved in water, the pH of the aqueous solution was adjusted to 8.0 with ammonia water, and a precipitate of ammonium catechol boric acid complex formed and was isolated by centrifugation. The precipitate, in an amount equivalent to 4.0 g catechol and 2.2 g boric acid was added to 100 ml culture broth of Erwinia herbicola ATCC 21433, 3 g sodium pyruvate, 4 g ammonium acetate and 30 ml water were added, and the pH of the resultant mixture was adjusted to 8.0 with ammonia water. The mixture was incubated at 20°C for 40 hours with shaking, and the reaction mixture contained 1.65 g/dl DOPA.

What we claim is:

1. A method of producing a phenylalanine derivative of the formula

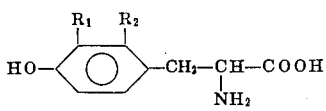

which comprises:
a. reacting a first compound of the formula

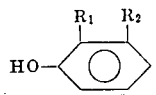

with
1. a source of an available amino acid selected from the group consisting of cysteine, cystine, serine, alanine, and S-lower-alkyl-cysteine, or with
2. ammonia and with a second compound selected from the group consisting of pyruvic acid, oxalacetic acid, malic acid, fumaric acid, maleic oxime, glyoxylic acid, and lactic acid, or a lower alkyl ester of said second compound, in aqueous solution in the presence of a source of an effective amount of $\beta$-tyrosinase at pH 4 to 11 until said derivative is formed, in said formulas $R_1$ and $R_2$ being hydrogen or hydroxyl, not more than one of said $R_1$ and $R_2$ being hydroxyl; and b. recovering the formed derivative from said solution.

2. A method as set forth in claim 1, wherein the concentration of said first compound in said solution is 0.1 percent to 20 percent w/v, and the concentration of said source of said amino acid corresponds to a concentration of 0.1 percent to 10 percent w/v as the free amino acid.

3. A method as set forth in claim 1, wherein said source of an amino acid is said amino acid in the free form, the ammonium, sodium, potassium or calcium salt of said amino acid, or the hydrochloride of said amino acid.

4. A method as set forth in claim 1, wherein said solution additionally contains a reducing agent.

5. A method as set forth in claim 4, wherein said reducing agent is sodium sulfite, sulfurous acid, potassium sulfite, ammonium sulfite, thiosulfuric acid, potassium thiosulfate, cystein, $\beta$-mercaptoethanol or ascorbic acid.

6. A method as set forth in claim 1, wherein said solution additionally contains a chelating agent.

7. A method as set forth in claim 6, wherein said chelating agent is EDTA, diethylamine, N-oxyethylenediamine, triethanolamine, aspartic acid, N-dioxyethylglycine, nitrilotriacetate, citric acid or thioglycolic acid.

8. A method as set forth in claim 1, wherein said derivative is 3, 4-dihydroxyphenyl-L-alanine, and said first compound is catechol.

9. A method as set forth in claim 8, wherein said solution contains boric acid.

10. A method as set forth in claim 9, wherein the amount of said boric acid is one mole to 1.5 moles per mole of said catechol.

11. A method as set forth in claim 1, wherein said first compound is partly added to said solution during said reacting.

12. A method as set forth in claim 8, wherein said source of $\beta$-tyrosinase comprises a culture broth containing a $\beta$-tyrosinase-producing microorganism, a cell-free filtrate of said broth, cells of said microorganism recovered from said broth, an aqueous suspension of substance of said cells, or a filtrate of said suspension.

13. A method as set forth in claim 12, wherein said broth is prepared by culturing said microorganism on an aqueous nutrient medium containing assimilable sources of carbon and nitrogen, inorganic and organic minor nutrients and tyrosine.

14. A method as set forth in claim 13, wherein said minor nutrients include a member of the group consisting of methionine, glycine, alanine, pyridoxine, pyridoxal, and pyridoxal phosphate.

15. A method as set forth in claim 13, wherein said tyrosine is contained in the aqueous nutrient medium in a concentration of more than 0.01 percent based on the weight of the aqueous medium.

16. A method as set forth in claim 12, wherein said microorganism is Citrobacter freundii ATCC 6750, Citrobacter freundii ATCC 8090, Proteus morganii IFO 3848, Proteus mirabilis ATCC 15290, Pseudomonas perlurida ATCC 490, Aerobacter aerogenes ATCC 7256, Salmonella gallinarum ATCC 9148, Erwinia herbicola ATCC 21433, Erwinia herbicola ATCC 21434, Paracolobactrum coliforme ATCC 11605 or Alcaligenes faecalis ATCC 8315.

* * * * *